Aug. 11, 1959    R. F. ZUMWALT    2,899,194
DOUBLE-ACTING LIQUID SPRING
Filed Sept. 5, 1956
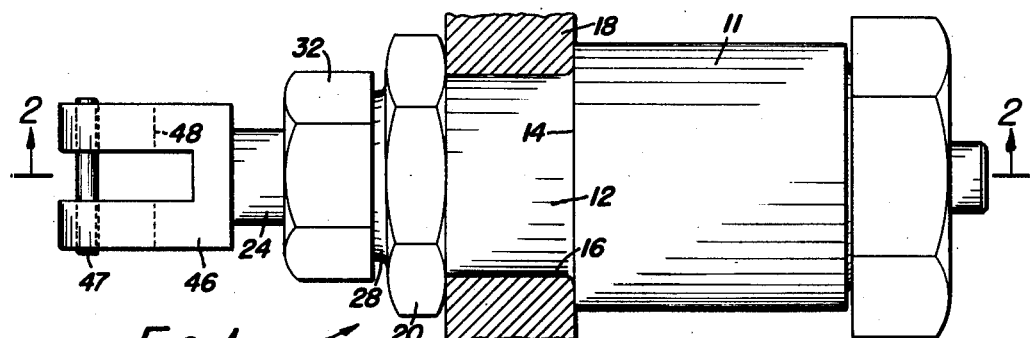
FIG. 1.
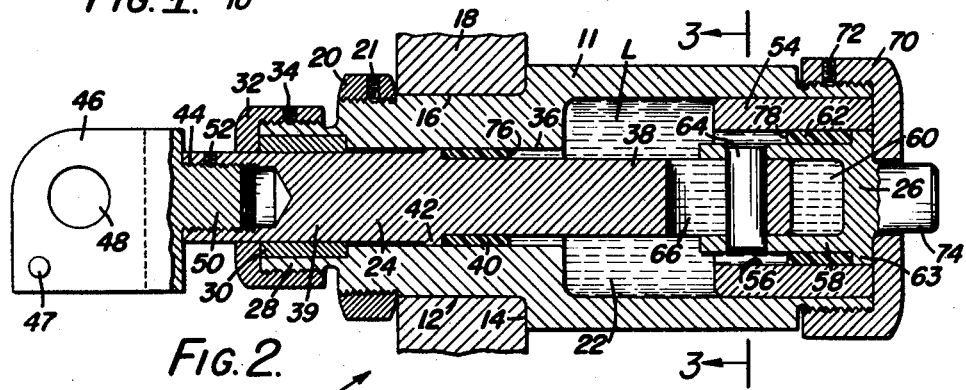
FIG. 2.
FIG. 3.
FIG. 4.
INVENTOR.
ROBERT F. ZUMWALT
BY
ATTORNEY

2,899,194
DOUBLE-ACTING LIQUID SPRING

Robert F. Zumwalt, Tonawanda, N.Y., assignor to George F. Wales, Kenmore, N.Y.

Application September 5, 1956, Serial No. 608,062

4 Claims. (Cl. 267—1)

The present invention relates generally to liquid springs, and, more particularly, to a double-acting liquid spring.

One of the problems in the utilization of liquid springs is that in many instances they are required to be double-acting, that is, they must act in both compression and tension. This can be achieved by providing two separate chambers; that is, in effect, providing almost two separate liquid springs, one to act in compression and the other to act in tension. Because of the high cost of liquid springs and because of the space factor, this is not ordinarily practical.

To reduce costs, a mechanical adapter cage may be provided for a conventional compression-type liquid spring, the cage being mounted to surround the spring and to be operatively connected to it in such manner that compression and/or tension forces are transmitted to the spring in compression. Thus double action can be achieved. Not infrequently the bulk becomes so great that the advantage of a liquid spring is obviated; and a less expensive mechanical spring is more easily used. Furthermore, the cage arrangement causes difficulty in that the friction loss in the various sliding members results in a loss of spring force and detracts from the usefulness of the spring. In many instances, therefore, liquid springs have been rejected because of the cost and space requirements of a double-acting unit.

There are, however, a great many applications for a double-acting liquid spring. In the copending patent application of Paul H. Taylor, Serial No. 501,273, filed April 14, 1955, now Patent No. 2,842,356, dated July 8, 1958, there is described a double-acting liquid spring adapted for use in the elevating mechanism of a tank gun. The spring disclosed in that patent application comprises a container having a chamber filled with a compressible liquid, a piston reciprocable in the chamber, and connecting elements interconnecting the spring with the relatively movable members whose movements are to be cushioned, where the connecting elements are so arranged that the piston is forced into the container to compress the liquid regardless of whether the movable members are moved toward or away from each other. In this way, the relatively movable members are cushioned by the liquid spring in both tension and compression.

However, the liquid spring disclosed in that patent application has an inherent design limitation which restricts its use to applications in which identical spring characteristics are provided in both tension and compression.

An object of the present invention is to provide a single liquid spring which in itself and without any outside adapter, such as a cage, will be double-acting and can be used in compression and in tension. To this end, it is a prime purpose of this invention to provide a double-acting spring from a single liquid spring.

Another object of the invention is to provide a liquid spring of the character described which is of extremely small size for the force to which it may be subjected.

Another object of the invention is to provide a double-acting liquid spring which is of sufficiently small size to be incorporated into a structural member subject to high impact forces.

A further object of the invention is to provide a double-acting liquid spring in which the spring characteristics in compression and tension may be different and may be adjusted by suitable proportioning of the parts of the spring.

A specific object of the invention is to provide a double-acting liquid spring operative in tension and in compression, and in which the spring is characterized in tension by low force and long stroke, and in compression by high force and short stroke.

Other objects of this invention will be apparent hereinafter from the specification and from the recital of the appended claims. From the specification and drawing, it will be obvious that the objects of the invention are fulfilled by the embodiment of the invention herein described and illustrated.

In the drawing, and in the detailed description thereof which follows hereinafter, there is shown a single specific embodiment of the invention. In that embodiment, the liquid spring has a body that is rigidly affixed to a supporting plate. The body has a chamber therein filled with a compressible liquid; and two pistons having operating areas of different size are reciprocably mounted in the chamber for movement relative to the body and the supporting plate.

The piston having the smaller operating area includes rod portions projecting outwardly and inwardly of the chamber. A yoke is mounted on the outwardly projecting portion, and force may be applied to the spring through the yoke. The inwardly projecting piston rod portion is interconnected with the piston of greater operating area, in the chamber, by a lost motion connection. When the spring is placed under tension, as by a movement of the yoke away from the support plate, the two pistons reciprocate simultaneously, the yoked piston moving outwardly of the chamber, and the other piston moving inwardly of the chamber, to effect a differential compression of the liquid in the chamber and provide a long stroke, low force liquid spring. When the spring is compressed, as by a force moving the yoke from an at rest position toward the support plate, the yoked piston is moved inwardly of the chamber to compress the liquid, while the other piston is held stationary, by a retainer cap secured to the body. There is thus produced during compression a short stroke, high force reaction in the liquid spring.

The details of the construction of the device will become more clear by reference to the detailed description which follows, considered with the drawing, in which:

Fig. 1 is a fragmentary side view showing a double-acting liquid spring constructed according to one embodiment of this invention and having the body thereof secured on a mounting plate;

Fig. 2 is an axial section thereof showing the spring in neutral position and taken on the line 2—2 of Fig. 1 looking in the direction of the arrows;

Fig. 3 is a section thereof taken on line 3—3 of Fig. 2 looking in the direction of the arrows; and Fig. 4 is a graph illustrating the operating characteristics of the spring.

In use, the spring of this invention is preferably incorporated directly in the mechanism with which it is to be utilized. Thus, it may be directly incorporated in a gun mounting to cushion the recoil and counter-recoil movements of the gun.

In the embodiment of the invention illustrated in the drawing, the liquid spring 10 has a generally cylindrical body 11 reduced to provide a neck 12 and a shoulder 14. The neck 12 passes through an aperture 16 in a gun mounting plate 18 and the shoulder 14 abuts against one side of the plate. A nut 20, which is threaded on the neck 12 serves to secure the body 11 to the mounting plate 18. The nut is held in place by a set screw 21.

The cylindrical body 11 contains a chamber 22 within which is confined a compressible solid or liquid material L, such as a compressible silicone fluid. A pair of axially aligned, opposed pistons are mounted at opposite ends of the chamber for reciprocation therein. For convenience, one of the pistons will be referred to as the actuating piston 24, and the second piston will be referred to as the auxiliary piston 26. The actuating piston 24 has a rod portion 38 projecting inwardly of the chamber and a rod portion 39 projecting outwardly of the chamber.

The neck 12 of the cylindrical body 11 of the spring has an extension 28 which is of further reduced outside diameter. Within extension 28 is mounted a slip bushing 30 which serves as a bearing and guide for the actuating piston 24. A retainer nut 32 is threaded to the extended reduced neck 28 and is held in place by a set-screw 34. The retainer nut 32 engages the bushing 30 to hold it in place within the reduced extended neck 28.

The actuating piston 24 is slidably mounted in the bore 36 of the neck 12. A seal 40 of the male type is mounted around the inwardly projecting portion 38 of the piston rod, within the bore 36, and engages on a shoulder 42 on the rod portion. The outwardly extending rod portion is slidably mounted in the reduced neck extension 28. A conventional connecting yoke 46 is secured to the outwardly projecting rod portion 39, having a projecting portion 50 threaded in a counterbore 44. A set screw 52 locks the projecting portion 50 in position. The yoke has a pin-hole 48 and a pin 47 mounted therein but spaced from the pin-hole.

A guide bushing 54 is secured in the chamber 22 engaging the chamber walls and spaced at the end of the chamber away from the mounting plate 18. The bushing 54 is brazed to the walls of the chamber, and has a bore 56 within which the auxiliary piston 26 is reciprocably mounted.

The auxiliary piston 26 has a cylindrical rod 58 which is counter-bored to provide a cup-shaped cylindrical bore 60 within which the piston rod 38 of the main piston 24 is reciprocably seated. A seal 62 of the male type is seated around the piston rod 58 to provide an effective seal between the piston rod and the wall of the bore 56 of the bushing 54. This seal 62 abuts against a shoulder 63 around the piston rod 58. The shoulder 63 engages the wall of the bore 56 of the bushing 54.

A pin 64 is press-fitted through a pair of apertures in the wall of the auxiliary piston rod 58 transversely of the cylindrical bore 60. The pin 64 extends through a slot 66 in the inwardly extending rod portion 38 of the actuating piston 24.

A retainer nut 70 is threaded around the end of the cylindrical body 11 and a set-screw 72 passes through the wall thereof and secures it in position on the cylinder 11. The shoulder or backup ring 63 of the auxiliary piston 26 engages the retainer nut 70. A stud 74 projects centrally from the auxiliary piston rod through an aperture in the retainer nut 70, and is engageable by any external member (not shown) movable relative to the support 18 for loading the spring differentially.

The seal 40 is a nylon seal of the type used for liquid springs and it has a working face 76 in contact with the compressible liquid L. The seal 62 that is mounted around the auxiliary piston is also of nylon of the conventional type and has a working face 78 in contact with the compressible liquid L.

In a typical installation of the double-acting liquid spring shown, the mounting plate 18 is the mounting plate in a gun mounting, and the yoke 46 is adapted to be connected with the recoil mechanism of the gun.

The spring is shown in Fig. 2 in its normal position, at rest. When the spring is placed in tension by a force acting through the yoke 46, the actuating piston is moved outwardly of the chamber 22. The actuating piston 24 is connected to the auxiliary piston 26 through the pin 64, and therefore, as the actuating piston 24 moves outwardly, the auxiliary piston 26 moves inwardly. There results a compression of the liquid L dependent upon the difference in effective total operating areas between the two pistons and their seals. As indicated in Fig. 4, over a stroke of 0.60 inch, a force of 15,000 pounds may be absorbed in tension, for a particular spring proportioned to absorb this force.

The gun is returned to its original position upon expansion of the compressed liquid L. As the liquid expands, the auxiliary piston is returned to the position shown in Fig. 1 by the action of the compressed liquid against the operating areas thereof, and it carries with it the actuating piston to which it is connected by the pin 64. The actuating piston, through the yoke, moves the gun toward its at-rest position.

As the actuating piston approaches its normal or at-rest position, the momentum of the gun carries the actuating piston through its normal position and into the chamber 22 in a counter-recoil stroke which effects compression of the liquid L. The slot 66 permits relative movement between the two pistons, and the actuating piston rod is forced into the cylindrical bore 60 of the auxiliary piston rod 38. The retainer nut 70 engages the auxiliary piston, and prevents it from moving. During this counter-recoil stroke, the liquid spring acts in compression and since the auxiliary piston does not move, compression of the liquid is caused solely by the inward reciprocation of the actuating piston. There results a linear compression of the liquid L which develops tremendous force over a short stroke. The movement of the gun in counter-recoil is arrested as its momentum is absorbed by the spring, and expansion of the liquid L occurs and returns the actuating piston and the gun to their normal position.

As indicated in Fig. 4, for a device properly proportioned, movement of the gun in counter-recoil can develop as much as a 10,000 pound force which is absorbed by the liquid spring over a stroke of 0.40 inch.

The spring may be preloaded to a desired compression of the liquid L by adjustment of the retainer nut 70 to adjust the initial or at-rest position of the auxiliary piston 26.

While the above description has been confined to the single embodiment of the invention illustrated in the drawing, it will be appreciated that many modifications are possible which are within the scope and spirit of the invention. Thus, for example, the embodiment described has only two pistons. However, a plurality of pistons may be employed at either or both ends of the chamber of the liquid spring, depending upon the specific application at hand. Moreover, the operation of the device described above is dependent upon a differential in the net operating areas of the pistons. By changing the size of the effective piston operating areas relative to each other, the spring characteristics may be controlled. Thus, the spring may be controlled to have equal spring rates in tension and compression, or different rates. The spring rate can be greater for either tension or compression input, depending upon the design requirements. As will be appreciated, for the specific gun mounting application described above, it is desirable that the spring have the particular characteristics described herein.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention what I claim is:

1. A liquid spring comprising, in combination: a body, said body having means disposed entirely intermediate and independent of its ends for attachment to a support and having a chamber therein filled with a compressible material selected from the group consisting of compressible solids and compressible liquids, two pistons reciprocable in said chamber and each projecting externally of said body, said pistons having, respectively, operating areas of different size in contact with said compressible material, lost motion means comprising rigid elements disposed within said chamber and connecting said two pistons, and means on said body limiting the reciprocation in a direction outwardly from said chamber of at least one of said pistons, the external projections of said pistons being disposed to be simultaneously engageable by members outside said body movable relative to the support to selectively load said spring differentially from either one of said projections, and to load said spring directly from one of said projections.

2. A liquid spring for absorbing both compression and tension forces comprising a body having a chamber therein filled with a compressible substance selected from the group consisting of compressible liquids and compressible solids, actuating piston means reciprocably mounted in one end of said chamber and being disposed to be engageable by an external force to operate said piston to reciprocate in said chamber, axially aligned auxiliary piston means mounted in the opposite end thereof, means on said body limiting the reciprocation of said auxiliary piston, each of said piston means including a generally cylindrical sealing member mounted around said piston means to prevent escape of said compressible substance from said chamber and for reciprocation upon reciprocation of its piston means, each said piston means having an operating area in contact with the compressible substance in said chamber, said piston means having different effective operating areas and being interconnected by a lost-motion connection comprising rigid elements for simultaneous reciprocation as a unit to effect differential compression of said substance in one direction of reciprocal compressive movement of said actuating piston and for reciprocal movement of said actuating piston alone to effect compression of said substance in the opposite direction of reciprocal compressive movement of said actuating piston.

3. A liquid spring for absorbing both compression and tension forces comprising a body having a chamber therein filled with a compressible substance selected from the group consisting of compressible liquids and compressible solids, an actuating piston reciprocably mounted in one end of said chamber and being disposed to be engageable by an external force to operate said piston to reciprocate in said chamber, an axially aligned auxiliary piston mounted in the opposite end thereof, means on said body limiting the reciprocation of said auxiliary piston, said pistons having different effective operating areas in contact with said compressible substance, said actuating piston including an elongated cylindrical rod disposed in said chamber, said auxiliary piston having a hollow cylindrical bore opening into said chamber and receiving said end of said actuating piston for reciprocation therein, said pistons being interconnected by a lost-motion connection, comprising an axially extending slot in one of said pistons and a pin carried by the other of said pistons and slidably extending through said slot, for simultaneous reciprocation as a unit to effect differential compression of said substance in one direction of reciprocal compressive movement of said actuating piston and for reciprocal movement of said actuating piston alone to effect compression of said substance in the opposite direction of reciprocal compressive movement of said actuating piston.

4. A liquid spring comprising a body having a chamber therein filled with a compressible substance selected from the group consisting of compressible liquids and compressible solids, an actuating piston reciprocably mounted in one end of said chamber and being disposed to be engageable by an external force to operate said piston to reciprocate in said chamber, an axially aligned auxiliary piston mounted in the opposite end thereof, means on said body limiting the reciprocation of said auxiliary piston, a generally cylindrical sealing member mounted around each piston to prevent escape of said compressible substance from said chamber, each said sealing member being mounted for reciprocation upon reciprocation of its piston, said auxiliary piston having a hollow bore opening into said chamber, said actuating piston having an end portion thereof axially slotted and reciprocably mounted in the bore of said auxiliary piston, a pin secured to said auxiliary piston slidably seated in the slot of said actuating piston to provide a lost-motion connection between the two pistons, said pistons having different effective operating areas in contact with said compressible substance, and said lost-motion connection providing for simultaneous reciprocation as a unit of the two pistons to effect a differential compression of said substance in one direction of reciprocal compressive movement of said actuating piston and for reciprocal movement of said actuating piston alone to effect compression of said substance in the opposite direction of reciprocal compressive movement of said actuating piston.

References Cited in the file of this patent

UNITED STATES PATENTS

| | | |
|---|---|---|
| 2,723,847 | Hogan | Nov. 15, 1955 |
| 2,751,216 | Taylor | June 19, 1956 |
| 2,760,575 | Taylor | Aug. 28, 1956 |
| 2,766,037 | Taylor | Oct. 9, 1956 |